United States Patent [19]

Schmalhofer

[11] 4,283,209
[45] Aug. 11, 1981

[54] SEPARATOR FOR SEPARATING OUT PARTICLES OF FATTY SUBSTANCES FROM A GAS CURRENT, MORE SPECIFICALLY FROM WASTE AIR FROM KITCHENS, AND A WASTE AIR DUCT FOR THE SEPARATOR

[76] Inventor: Markus Schmalhofer, 8351 Aholming, Bundesrepublik Deutschland, Fed. Rep. of Germany

[21] Appl. No.: 9,973

[22] Filed: Feb. 6, 1979

[30] Foreign Application Priority Data

Jul. 26, 1978 [DE] Fed. Rep. of Germany ....... 2832864

[51] Int. Cl.³ .................... B01D 50/00; F24C 15/20
[52] U.S. Cl. ...................................... 55/325; 55/329; 55/444; 55/445; 55/447; 55/DIG. 36; 126/299 D
[58] Field of Search ................. 55/308, 316, 325, 329, 55/337, 445, 444, 447, 464, DIG. 36; 126/299 D

[56] References Cited

U.S. PATENT DOCUMENTS

| 692,390 | 2/1902 | Waggoner | 55/444 |
|---|---|---|---|
| 752,418 | 2/1904 | Reilly | 55/444 |
| 885,185 | 4/1908 | Serrell | 55/444 |
| 1,134,633 | 4/1915 | Noll et al. | 55/444 |
| 1,159,073 | 11/1915 | Nies et al. | 55/464 |
| 2,474,540 | 6/1949 | Marsh | 55/444 |
| 2,720,938 | 10/1955 | Cates | 55/444 |
| 2,874,627 | 2/1959 | Simmonds | 98/115 K |
| 2,967,586 | 1/1961 | Jaklitsch | 55/316 |
| 3,433,146 | 3/1969 | Russell | 98/115 K |
| 3,566,585 | 3/1971 | Voloshen et al. | 55/435 |
| 3,815,336 | 6/1974 | Rigo | 55/447 |
| 3,834,135 | 9/1974 | Jordan | 55/444 |
| 3,898,922 | 8/1975 | Savage | 98/115 R |
| 3,955,949 | 5/1976 | Rohrer | 55/444 |
| 3,960,526 | 6/1976 | Andrews | 55/227 |
| 3,972,678 | 8/1976 | Nakshbendi | 55/316 |

FOREIGN PATENT DOCUMENTS

| 329827 | 3/1919 | Fed. Rep. of Germany . |
| 1934276 | 1/1971 | Fed. Rep. of Germany . |
| 2444741 | 4/1975 | Fed. Rep. of Germany . |
| 2737386 | 3/1978 | Fed. Rep. of Germany . |
| 2214500 | 8/1974 | France . |
| 2349356 | 11/1977 | France . |
| 588663 | 6/1977 | Switzerland . |
| 1157466 | 7/1969 | United Kingdom . |

Primary Examiner—David L. Lacey
Attorney, Agent, or Firm—Sprung, Felfe, Horn, Lynch & Kramer

[57] ABSTRACT

A separator for removing oil or fat particles from waste air, more specifically from a catering kitchen, has a system of generally parallel rods normal to the direction of the waste air current. The rods are distributed across the full cross-section of the waste air in the duct, and turbulence is produced in the waste air when it passes the rods so that oil and fat is entrained on the rods.

15 Claims, 4 Drawing Figures

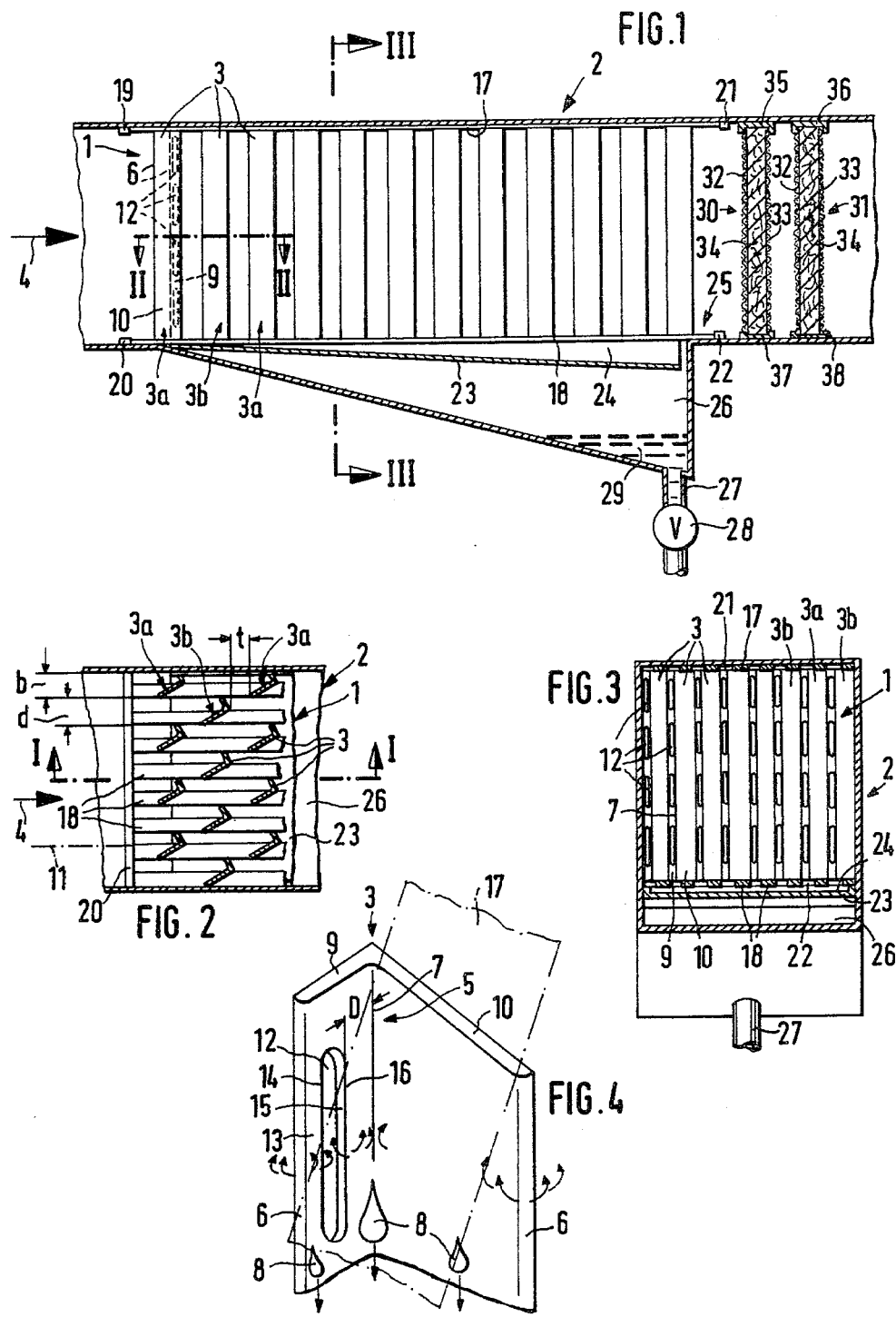

SEPARATOR FOR SEPARATING OUT PARTICLES OF FATTY SUBSTANCES FROM A GAS CURRENT, MORE SPECIFICALLY FROM WASTE AIR FROM KITCHENS, AND A WASTE AIR DUCT FOR THE SEPARATOR

BACKGROUND OF THE INVENTION (1) Field of the Invention

The invention relates to a separator for separating out fatty and oily substance particles from kitchen waste air and other gas currents and to a waste air duct specially designed for use with such a separator.

(2) Prior art

For separating out particles of fatty substances or the like, more specifically from the waste air of catering kitchens, separator units, generally full of loose solids or having a solid material bed filter, are placed in the duct coming from the draw-off hoods. As commonly put to use, such separators may have sieve walls forming limiting structures, between which a solid material bed is placed which may be made up of active carbon with the necessary grain size and which takes up the fatty substance particles in the air which goes through the separator.

One important shortcoming of such separators, in addition to a comparatively high specific resistance to flow, is that if the waste air to be separated has a great amount of undesired materials in it, the take-up effect of the bed of solids quickly comes to an end and the separator hardly has any further effect and acts only as a structure stopping the current of air from moving freely through the system. When the bed of solids is fully saturated, the separator or the bed of solids has to be replaced. If this need is overlooked, something which is frequently the case because of the working conditions in a kitchen, the particles of fatty substances will go as far as the part of the waste air duct forming the outlet of the separators. It is for this reason as well that public authorities make it necessary for certain safety measures to be taken for seeing to it that there is no danger of fire in the duct running from the separator, and taking such safety measures is a complex process.

SUMMARY OF THE INVENTION

On the other hand one purpose of the present invention is that of designing a separator for separating out fatty and oily substance particles from kitchen waste air and other gas currents, which, more specifically when used as the first of two or more separators makes possible a very high-level cleaning of the waste air, even when the air has a great amount of waste material in it, this being so without there being a loss of the separating effect as time goes by or any stopping up of the separator so that there is no need for servicing operations in these or other respects.

For effecting these and other purposes, the separator of the invention has a structure comprising a number of rods, at least generally parallel to each other, there being a distribution of the rods over substantially the complete cross-section seen by the waste air current.

Because the rods are placed in rows, the air current is changed in direction at certain positions, this being responsible for turbulence. The limited fields of turbulence are moved up against further rods and give up the fatty particles in the current on the free faces of the rods, so that the air current, upon moving further and further along the duct through the rod system, will give up more and more fat waste material by coating the material on the free faces of the rods, which, to a certain degree, may be though of as sticky or adhesive faces. The liquid fat running against the rods is moved downwards under its own weight and then let off so that the separator keeps itself clean, as it were, or is responsible for its own regeneration. Because of the temperature of the kitchen waste air, which is kept on the move all the time through the separator, the fat is kept in a liquid enough condition.

Further developments of the invention which produce advantageous results, which are more specifically to do with producing the best form of current motion or turbulence for the best coating effect of the substances on the rods and the letting off the fatty waste, will be seen hereinafter, which furthermore are consistent with the purpose of having the simplest possible design of the structure.

The fixing of a separator of the invention in a waste air duct is best undertaken in such a way that the rods are upright for making possible a let-off or downward motion of the taken up fatty waste with the least possible opposing effect. For this purpose it is possible for further fine filters to be placed after the separator of the invention, in the direction of the waste air, such fine filters being of commonly used design with a solids bed, which are responsible for taking up the further, small amount of waste substances. Because these fine filters only have to take up the smallest amount of waste substances, because the air has moved through the first separator, their length of life, that is to say the time they are used before having to be changed over with new filters, is made many times longer than conventional filter for example, it may be increased from a period of days to a period of months or even years. For this reason protection of the waste air duct coming from the filters has a very much higher degree of protection against becoming coated or stopped-up with fatty substances, so that in addition to putting an end to the building up masses of waste material, something making servicing operations necessary, on the duct walls, less work is necessary for protection against fire. Because of this, again, the structure is made simpler and testing by public authorities is as well made much simpler.

BRIEF DESCRIPTION OF THE DRAWINGS

Further measures, details and good effects of the invention will be seen from the account now to be given of one form of the invention as viewed in the figures wherein:

FIG. 1 is a diagrammatic longitudinal section through a waste air duct with a separator using the invention, generally along the line I—I of FIG. 2.

FIG. 2 is a partial section through the waste air duct near the filter along the line II—II of FIG. 1.

FIG. 3 is a section along the line III—III of FIG. 1.

FIG. 4 is a perspective view, on a greater scale, of the top part of a rod of the separator as seen in FIGS. 1 to 3.

DETAILED DESCRIPTION OF THE INVENTION

In the way made clear in FIGS. 1 to 3, a separator of the invention, generally referenced 1, is placed in a waste air duct 2 as may be used, more specifically, for letting off waste air from catering kitchens.

The deflector particle separator 1, which may be more than half a meter long, is generally made up of rods 3, in the example viewed, at least roughly upright and having such a structure as is viewed in FIG. 4 with respect to the top part, to be seen on a greater scale, of such a rod 3. The rods 3 are, as is more specifically to be seen from FIG. 2, placed running across the current direction (arrow 4) in lines or rows 3a and 3b, one line 3a coming after a line 3b, then a line 3a and so on. In this respect the rods 3 of the one sort of lines or rows 3a are placed opposite to spaces between rods 3b in the next line, but in other respects the lines or rows 3a and 3b are of the same design. The distance sideways d between separate rods 3 of a rod line 3a or 3b is not to be made overly great for making certain that a high-level turbulence effect is produced in the air and twice the overall breadth b, measured as well normally to the current direction (arrow 4) of a single rod 3 being the greatest possible size to be used. In the case of the example of the invention the sideways distance d between the separate rods 3 of a row or line 3a and 3b is quite the same as the breadth b of a single rod 3. As can be seen from FIG. 3, two the rows 3a and 3b, as seen one behind the other in the view from the top, take up the full cross-section of the separator 1 and no more. The current moves in sharp curves around the rods 3 of the successive rows 3a and 3b, so that fat particles in the air are removed from the current by a centrifuging effect and the particles impact and become fixed on the solid faces of the rods 3.

For making certain that the fatty particles come up against the rods 3 to an even greater degree and to make certain that the fat particles are cleared from the waste air current, the rods 3 are specially designed and the free distance t measured in the direction of the current or flow, (arrow 4), between the rods 3 of two rod lines 3a and 3b next to each other is generally equal to the side-to-side distance d between single rods 3, next to each other, of a line 3a or 3b, and in the example of the invention considered the distance t is made somewhat smaller than this.

As will be seen more specially from FIGS. 2 and 4, the rods 3 are of troughed or L-like cross-section forming a trough or opening, represented by number 5, opening against the direction of motion of the waste air. In other words, the rods are formed with a groove running in the long-direction of each rod. The waste air, which at the side edges 6 of the trough or groove 5 is turbulently moved as is to be seen in FIG. 4, is responsible for turbulent motion from the two sides into the opening 5, so that, because of the twisting effect, fat particles are centrifuged out, more specifically at the innermost part 7 of the opening 5. These fat particles, centrifuged out and running together in the form of fat drops 8 are positioned, as is made clear in FIG. 4, more specifically at the innermost part 7 but, however, as well on the other outer faces of the opening 5 and, under the effect of their own weight, are moved down the rods 3.

In the example of the invention shown, the rods 3 are in the form of elements having a V-like cross-section, so that each rod faces the waste gas current with the opening or trough 5. It is naturally possible, however, to make use of a rounded V-form or an U-form in the same sort of way.

In this respect, it is particularly advantageous if the one arm 9 of the V-cross-section is made shorter than the other arm 10, a good outcome being produced if the arm 9 is made at least half as short or even shorter than the arm 10. More specifically in the case of a system in which the middle line 11, halving the angle of the V-form, (see FIG. 2), generally parallel to the direction of the current (arrowed 4), it is possible to make certain that the trough 5 is not taken up by a thick, unmoving air cushion, stopping motion of the turbulences deep into the opening 5 to a position near its innermost part 7 and the coating of fat particles on the rod. Furthermore, it seems that the turbulences produced at and moving away from the edges 6 (which are placed out of line in the current direction, (arrow 4), of the arms 9 and 10 of the rods 3 and this system is something making it more readily possible for the turbulences to go right into the hollow or trough 5 an makes less possible the collision of lines of turbulences, which are the mirror images of each other about the middle line 11, with the outcome that an air cushion is formed near the innermost part 7 of the opening or trough 5.

However, the short arm of the V-cross-section may not be made shorter unlimitedly for stopping the forming of an air cushion near the innermost part 7 of the trough, because a certain lower limit to the length is necessary for making certain that from the edge of the arm 9 turbulence will be produced in the incoming air layers and be moved into the trough or opening 5. So, if for this reason the shorter arm 9 is to have a certain shortest possible length for making certain that fatty waste air goes into the trough 5 from the two edges 6 of the cross-section, this necessitates the forming to a certain degree of an unmoving boundary layer or of an air cushion near and at the innermost part 7, even though this will be to a lesser extent, because of the different arm design noted. For further decreasing the forming of any such air cushion there is, for this reason, a system of cutouts 12 near the innermost part 7 of the trough or opening 5 and through these cutouts air, coming into the trough 5, may take part in the general current motion (arrow 4) and there will be nothing getting in the way of the moving in of further air. From the point of view of aerodynamics, the placing of the cutouts 12, which as is specifically well shown in FIG. 4, are designed with an elongated form, would be desired in the innermost part 7 itself, because this would make for the best runout of air after it has come into the trough or opening 5. In this case, however, the innermost part of the trough 5 would not be used for downward motion of the fat drops 8 and such drops would in fact, on coming to cutouts 12 lower down, be moved through the cutouts as far as the back side of the rod 3 and be forced into the air current again. In this respect it is to be noted as well that furthermore on the cross-section arms 9 and 10 in the current direction before the innermost part 7 of the trough 5, fat drops which have come together and are moving downwards, will be more and more moved by the air blowing on them into the innermost part 7, so that a great amount of the fat particles cleared from the air at the top part of the rods 3 are able to go through the cutouts 12 in the innermost part 7 itself and thus taken up by the air current again before they are able to go out of it by downward motion.

For this reason the cutouts 12, which are furthermore placed in a line, to be seen in FIGS. 1 and 3, parallel to the median line of the rod 3 in question, are, it is true, placed near the innermost part 7 of the trough, but, however, are to the side of it to such a degree that they are spaced from the innermost limit by a distance D in the way to be seen in FIG. 4, this distance D making it possible for enough fat drops to be taken up and be moved downwards without running into the cutouts. Nevertheless there is the necessary run off of air, coming into the innermost part 7 of the trough, through the cutouts 12, so that there is no undesired air cushioning.

In this respect, in the case of an arm 9 having cutouts, the parts of the arm between the cutouts 12 of a single rod, have an undesired effect, so that the outer part 13 of the arm 9 between its edge 6 and the edge 14, which is to the front in the direction of current motion, of the cutouts 12 may be made as a part separate from the rest of the rod 3 and which would only be used for producing further turbulence at a position in front of the front edge (of the arm 9) placed near the edge 15 (which is to the back in the direction of current) of the cutouts 12. On the same lines it would furthermore be possible to have, in place of a line or row of long-form cutouts 12, a single through opening running from the top side to the lower side of each rod 3. Such a design, which is the best from the aerodynamic viewpoint, will, however, be responsible for shortcomings, because the structure will not be so strong in view of the design and supporting of the rod or the like, which at least for nearly the full height of the waste air duct 2 is not supported, in front of the arm 9, so that for making the structure stronger the aerodynamically unimportant shortcomings of complete or free wall parts of the arm 9, that is to say parts without cutouts, between the cutouts 12, are to be put up with.

A specially good effect is produced if the lines of the cutouts 12 are placed in the shorter arm 9 because, at any rate in the case of the system given for example of the rods 3 in FIG. 2, this is seemingly responsible for the best possible current conditions in view of the purpose to be effected. The effect of the rods 3 in clearing fatty substances from the waste air may be made even better if the cutouts 12 are made in the face, which is later turned opposite to the direction of flow, of the arm 9, so that, at the edges of the cutouts 12 facing the current, rough structure 16 or flash, will be produced which are not machined smooth and in fact are kept in place. At these uneven, edge structures 16 there will be a further cutting up or turbulence effect on the air current which will make for an even further increase in the clearing of substances from the waste air, that is to say coating them on the solid structures. Furthermore the rods 3 are more specifically made of steel and, in the way noted in FIG. 4 have a finely machined, smooth face which makes it more readily possible for the drops of fat to go downwards. In the example shown the rods 3 of special cross-section are made of stainless chrome steel which is chrome-plated so as to have a pleasing appearance.

In the form of the invention shown, in each second line 3a or 3b rods 3, which are in line in the current direction, arrow 4, are joined at their top ends by struts 17 running in the longitudinal direction and at their lower ends are joined with each other by struts 18 in the same direction and stretching over the complete length of the filter 1. The fixing of the rods 3 on the struts 17 and 18 may be by welding or spot welding, for which purpose the necessary guide or template may be used. For making possible motion of the fat drops 8 downwards without anything in their way, the innermost part 7 of the opening 5 is not covered by the lower struts 18 at any rate. In the example shown, in the way to be seen more specifically from FIG. 3, the lower struts 18 are made generally half as broad as the breadth b of the single rods 3 and are placed running from the edge 6 of the longer arm 10 as far as a position short of the innermost part 7 of the opening or trough 5, something which is completely in order for certain fixing. For making it clearer in FIG. 4, the run of a top struts 17 on the rod 3 is to be seen in broken lines, and in the structure in question the top struts 17 are designed and placed in quite the same way as the lower struts 18. At their front and back ends the fixing struts 17 and 18, designed for example as flat steel strips, are joined with each other by cross-struts 19 and 20 and 21 and 22 of generally the same design and, for this reason, fixed in relation to each other.

Because the current of waste air has the effect of forcing the drops 8 on the faces of the V-like rods towards the innermost part 7 of the trough 5, the lower struts 18, which come to an end near the innermost part 7, are not in the way of motion of the drops past the lower ends of the rods 3. From this position the drops will be falling onto a runoff plate 23, which is fixed to the outer side of the lower struts 18 near the front end of the separator 1 and is placed at an angle so that a space 24 is formed which is narrow at the front and gets wider in a backward direction. The runoff plate 23 comes to an end short of the support end 25, which is to the back in the current direction 4, of the separator 1, so that motion of the liquid fat from this position into a takeup space 26 is possible. In a lower part of the takeup space 26, there is a runoff pipe 27, which in the case of the structure shown, may be shut off by a stopper 28. In this way the separator 1 may be used over a long time with non-stop runoff of fat by way of the runoff plate 23 into the takeup space 26, while the stopper 28 is shut, so that in the lower part of the takeup space 26 a mass of liquid fat 29 will be formed. At certain times the stopper 28 may then be opened for clearing the fat from the takeup space 26 as necessary. In this respect there is no need for dropping fat having to be taken off any position all the time, something which would make operation more complex than only having to let off liquid fat from the takeup space 26 from time to time with a bucket or the like.

At the back supported end 25 of the separator 1, the waste air has generally been completely freed of all fat particles and any other undesired substances, which, mixed up with the fat, are let off with it. For this reason it is possible to do without any further filtering measures, although it is to be noted that the separator 1 will have its separating effect to a degree which is dependent upon its length, if the necessary design is used, so that in theory a quite complete filtering out effect would only be possible with an unending separator. In this respect the best possible compromise is to be made, in which, although the design of the separator 1 is not overcomplex, the separator does not take up overly much space, and is in fact limited to be in line with sound teachings, but on the other hand a separating effect which is complete enough for the purpose on hand to be made certain of. The outcome is that at the outlet of the separator 1 the waste air will still have undesired substances, that is to say fat particles as well, although the amount will be smaller by a number of powers of ten than the amount in the input air to the separator 1. If these undesired substances are transported on further along the waste air duct 2, the operation of the separator 1 will, generally speaking, be like that of state of the art separators but with the useful, better effect that there is a non-stop self-cleaning effect and servicing or the like is not necessary. However, from time to time it will be necessary for material to be removed from the takeup space 26 through runoff pipe 27. The placing of fine filters 30 and 31 downstream of the separator apparatus of the invention produces the further useful effect that, after passing through the last filter 31, the air has been so completely freed of fat particles that the amount of them may no longer, generally speaking, be measured, so that a system for protection against fires or the like will not be necessary. The fine filters 30 and 31 may be of normal design with front and back sieve walls 32 and 33 between which a bed of solid particles of fibrous material 34 as shown is placed. With such an arrangement, however, the changing of the filters 30 and 31 is only necessary very infrequently, because, coming after the separator 1, they only have to take up a very small amount of fat particles. For exchanging them the filters 30 and 31 may be pulled out sideways from the waste air duct 2 in a normal way on guiderails 35, 36, 37 and 38, so that new filters may then be put in their place.

The separator apparatus of the invention may be used for separating out any fatty or oily particles, that is to say high-boiling point liquids, from the waste air.

I claim:

1. A separator for removing fatty or oily particles from a current of waste gas, comprising: a frame having an inlet open end and an outlet open end, and a plurality of rods mounted in the frame substantially parallel to each other and over at least the full cross-section of the frame in rows extending normal to the longitudinal axis of the frame between said inlet end and said outlet end, each rod configured to define a trough facing opposite the inlet open end and spaced apart by a distance at most twice the breadth of an individual rod, wherein the rods of one row are staggered with respect to the rods of the adjacent rows and the spacing between diagonally adjacent rods is at least approximately equal to the spacing between the rods in each row and wherein each rod comprises means for controlling the flow of waste gas through the separator to effect the flow of waste gas into the trough thereof comprising at least one elongated hole extending along the longitudinal axis of the rods in a wall of the trough.

2. The separator as claimed in claim 1, wherein said at least one hole comprises more than one hole disposed in a line and each hole has a rough inlet edge.

3. The separator as claimed in claim 1, wherein the rods have a V-like cross-section with the space between the arms of the cross-section defining the trough and wherein the middle line of the V-cross-section is substantially normal to the longitudinal axis.

4. The separator as claimed in claim 1, wherein the rods have a U-shaped cross-section.

5. The separator as claimed in claim 3 or claim 4, wherein one of the arms of the cross-section is shorter by at least approximately one half in relation to the other arm and wherein the shorter arm of the cross-section has the at least one hole therein.

6. The separator as claimed in claim 1, wherein the at least one hole is adjacent the innermost part of the trough.

7. The separator according to claim 6, wherein the at least on hole is to the side of the innermost part of the trough.

8. The separator as claimed in claim 1, wherein the rods are made of steel and at their outer faces are smooth.

9. The separator as claimed in claim 8, wherein the rods are chrome plated with a polished finish.

10. The separator as claimed in claim 1, further comprising spaced apart struts connected to the ends of the rods for securing the rods in position in a duct.

11. A waste air duct for catering kitchens and the like comprising the separator as claimed in claim 1 with the rods of the separator disposed vertically and the duct walls are placed at the sides of the separator with substantially no clearance.

12. The duct as claimed in claim 11, further comprising at least one fine filter facing the outlet open end.

13. The separator as claimed in claim 1, further comprising a runoff plate at the lower ends of the rods which is spaced from the lower ends of the rods and is inclined downward from the inlet open end towards the outlet open end.

14. The separator as claimed in claim 13, further comprising means forming a takeup space is provided at the end of the runoff plate for downwardly moving separated out material and a runoff pipe is joined with the takeup space.

15. The separator as claimed in claim 14, further comprising means for tightly stoppering the runoff pipe.

* * * * *